(12) United States Patent
Hansen et al.

(10) Patent No.: US 11,933,417 B2
(45) Date of Patent: Mar. 19, 2024

(54) IRRIGATION SPRINKLER SERVICE VALVE

(71) Applicant: Rain Bird Corporation, Azusa, CA (US)

(72) Inventors: Glade Lamar Hansen, Vail, AZ (US); Scott Allen Rottler, Vail, AZ (US); Andrew Joseph Pace, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 295 days.

(21) Appl. No.: 16/948,605

(22) Filed: Sep. 24, 2020

(65) Prior Publication Data
US 2021/0095778 A1   Apr. 1, 2021

Related U.S. Application Data

(60) Provisional application No. 62/907,289, filed on Sep. 27, 2019.

(51) Int. Cl.
*F16K 31/04* (2006.01)
*F16K 1/22* (2006.01)
*F16K 5/06* (2006.01)

(52) U.S. Cl.
CPC ............ *F16K 31/047* (2013.01); *F16K 1/221* (2013.01); *F16K 5/0647* (2013.01)

(58) Field of Classification Search
CPC ....... F16K 31/047; F16K 1/221; F16K 5/0647
See application file for complete search history.

(56) References Cited

U.S. PATENT DOCUMENTS

| | | |
|---|---|---|
| 894,898 A | 8/1908 | George |
| 1,123,746 A | 1/1915 | Jewell |
| 1,203,542 A | 10/1916 | Hawley |
| 1,726,490 A | 8/1929 | Irving |
| 1,758,119 A | 5/1930 | Le Moon |
| 1,931,761 A | 10/1933 | Hertel |
| 2,075,589 A | 3/1937 | Munz |
| 2,187,549 A | 1/1940 | Thompson |
| 2,268,855 A | 1/1942 | Brooks |
| 2,446,918 A | 8/1948 | Goddard |
| 2,591,282 A | 4/1952 | Nelson |
| 2,607,623 A | 8/1952 | Lippert |
| 2,693,816 A * | 11/1954 | Hoelzer .............. E03B 9/08 251/291 |
| 2,796,293 A | 6/1957 | Morris |
| 2,810,607 A | 10/1957 | Hruby, Jr. |
| 3,107,056 A | 10/1963 | Hunter |
| 3,263,930 A | 8/1966 | Friedmann |

(Continued)

OTHER PUBLICATIONS

U.S. Appl. No. 62/907,289, filed Sep. 27, 2019 for Irrigation Sprinkler Service Valve, 27 pages.

(Continued)

*Primary Examiner* — Eric Keasel
(74) *Attorney, Agent, or Firm* — Fitch, Even, Tabin & Flannery, LLP

(57) ABSTRACT

There is provided a service valve for use at an irrigation sprinkler. The service valve enables water flow into the sprinkler to be controlled from above a buried irrigation sprinkler. The service valve enables maintenance of internal components of the sprinkler without having to turn off a service valve that is remotely located from the sprinkler.

11 Claims, 14 Drawing Sheets

(56) References Cited

U.S. PATENT DOCUMENTS

| | | |
|---|---|---|
| 3,323,725 A | 6/1967 | Hruby, Jr. |
| 3,334,817 A | 8/1967 | Miller |
| 3,404,840 A | 10/1968 | Trickey |
| 3,404,841 A | 10/1968 | Brittain |
| 3,454,225 A | 7/1969 | Hunter |
| 3,521,822 A | 7/1970 | Friedmann |
| 3,523,647 A | 8/1970 | Radecki |
| 3,567,125 A | 3/1971 | Houghton |
| 3,655,132 A | 4/1972 | Rosic |
| 3,734,456 A | 5/1973 | Varrin |
| 3,782,638 A | 1/1974 | Bumpstead |
| 3,870,236 A | 3/1975 | Sahagun-Barragan |
| 3,873,030 A | 3/1975 | Barragan |
| 3,896,999 A | 7/1975 | Barragan |
| 3,921,912 A | 11/1975 | Hayes |
| 3,934,820 A | 1/1976 | Phaup |
| 3,948,285 A | 4/1976 | Flynn |
| 4,091,997 A | 5/1978 | Ridgway |
| 4,105,050 A | 8/1978 | Hendrickson |
| 4,105,186 A | 8/1978 | Eby |
| 4,189,099 A | 2/1980 | Bruninga |
| 4,295,631 A | 10/1981 | Allen |
| 4,314,582 A | 2/1982 | Drori |
| 4,417,691 A | 11/1983 | Lockwood |
| 4,492,210 A | 1/1985 | Hunt |
| 4,498,626 A | 2/1985 | Pitchford |
| 4,592,390 A | 6/1986 | Boyd |
| 4,624,412 A | 11/1986 | Hunter |
| 4,625,914 A | 12/1986 | Sexton |
| 4,634,052 A | 1/1987 | Grizzle |
| 4,650,118 A | 3/1987 | Saarem |
| 4,681,259 A | 7/1987 | Troup |
| 4,702,417 A | 10/1987 | Hartley |
| 4,708,291 A | 11/1987 | Grundy |
| 4,718,605 A | 1/1988 | Hunter |
| 4,773,595 A | 9/1988 | Livne |
| 4,784,325 A | 11/1988 | Walker |
| 4,787,558 A | 11/1988 | Sexton |
| 4,790,481 A | 12/1988 | Ray |
| 4,819,875 A | 4/1989 | Beal |
| 4,867,378 A | 9/1989 | Kah |
| 4,867,379 A | 9/1989 | Hunter |
| 4,874,017 A | 10/1989 | Hendrickson |
| 4,880,167 A | 11/1989 | Langa |
| 4,892,252 A | 1/1990 | Bruninga |
| 4,898,332 A | 2/1990 | Hunter |
| 4,901,924 A | 2/1990 | Kah |
| 4,913,352 A | 4/1990 | Witty |
| 4,919,337 A | 4/1990 | Van Leeuwen |
| 4,925,098 A | 5/1990 | Di Paola |
| 4,955,542 A | 9/1990 | Kah |
| 4,967,961 A | 11/1990 | Hunter |
| 4,971,256 A | 11/1990 | Malcolm |
| 4,972,993 A | 11/1990 | Van Leeuwen |
| 5,009,368 A | 4/1991 | Streck |
| 5,031,833 A | 7/1991 | Alkalay |
| 5,048,757 A | 9/1991 | Van Leeuwen |
| 5,050,800 A | 9/1991 | Lamar |
| 5,052,621 A | 10/1991 | Katzer |
| 5,098,021 A | 3/1992 | Kah |
| 5,115,977 A | 5/1992 | Alkalay |
| 5,148,990 A | 9/1992 | Kah |
| 5,148,991 A | 9/1992 | Kah |
| 5,163,622 A | 11/1992 | Cohen |
| 5,207,386 A | 5/1993 | Mehoudar |
| 5,213,303 A | 5/1993 | Walker |
| 5,257,646 A | 11/1993 | Meyer |
| 5,288,023 A | 2/1994 | Han |
| 5,330,103 A | 7/1994 | Eckstein |
| 5,383,600 A | 1/1995 | Verbera |
| 5,400,973 A | 3/1995 | Cohen |
| 5,417,370 A | 5/1995 | Kah |
| 5,473,961 A | 12/1995 | Jackson |
| 5,556,036 A | 9/1996 | Chase |
| 5,609,303 A | 3/1997 | Cohen |
| 5,620,143 A | 4/1997 | Delmer |
| 5,641,122 A | 6/1997 | Alkalai |
| 5,647,541 A | 7/1997 | Nelson |
| 5,653,390 A | 8/1997 | Kah |
| 5,673,855 A | 10/1997 | Nguyen |
| 5,676,315 A | 10/1997 | Han |
| 5,685,486 A | 11/1997 | Spenser |
| 5,695,123 A | 12/1997 | Van Le |
| 5,758,827 A | 6/1998 | Van Le |
| 5,762,270 A | 6/1998 | Kearby |
| 5,823,440 A | 10/1998 | Clark |
| 5,829,685 A | 11/1998 | Cohen |
| 5,829,686 A | 11/1998 | Cohen |
| 5,871,156 A | 2/1999 | Lawson |
| 5,875,813 A | 3/1999 | Cook |
| 5,875,815 A | 3/1999 | Ungerecht |
| 5,881,757 A | 3/1999 | Kuster |
| 5,899,386 A | 5/1999 | Miyasato |
| 5,938,122 A | 8/1999 | Heren |
| 5,957,391 A | 9/1999 | Defrank |
| 5,975,430 A | 11/1999 | Larsen |
| 5,992,760 A | 11/1999 | Kearby |
| 6,000,632 A | 12/1999 | Wallace |
| 6,015,102 A | 1/2000 | Daigle |
| 6,029,907 A | 2/2000 | McKenzie |
| 6,039,268 A | 3/2000 | Grundy |
| 6,042,021 A | 3/2000 | Clark |
| 6,050,502 A | 4/2000 | Clark |
| 6,079,437 A | 6/2000 | Beutler |
| 6,085,995 A | 7/2000 | Kah |
| 6,109,545 A | 8/2000 | Kah |
| 6,155,493 A | 12/2000 | Kearby |
| 6,158,675 A | 12/2000 | Ogi |
| 6,178,993 B1 | 1/2001 | Oberdorfer |
| 6,209,801 B1 | 4/2001 | Kearby |
| 6,213,408 B1 | 4/2001 | Shekalim |
| 6,227,455 B1 | 5/2001 | Scott |
| 6,237,862 B1 | 5/2001 | Kah |
| 6,241,158 B1 | 6/2001 | Clark |
| 6,244,521 B1 | 6/2001 | Sesser |
| 6,264,117 B1 | 7/2001 | Roman |
| 6,336,597 B1 | 1/2002 | Kah |
| 6,364,217 B1 | 4/2002 | Lockwood |
| 6,371,390 B1 | 4/2002 | Cohen |
| 6,382,530 B1 | 5/2002 | Perkins |
| D458,554 S | 6/2002 | Jolly |
| 6,457,696 B1 | 10/2002 | Hirota |
| 6,478,237 B2 | 11/2002 | Kearby |
| 6,491,235 B1 | 12/2002 | Scott |
| 6,494,384 B1 | 12/2002 | Meyer |
| 6,499,672 B1 | 12/2002 | Sesser |
| 6,568,607 B2 | 5/2003 | Boswell |
| 6,568,608 B2 | 5/2003 | Sirkin |
| 6,581,854 B2 | 6/2003 | Eckstein |
| 6,601,781 B2 | 8/2003 | Kah |
| 6,607,147 B2 | 8/2003 | Schneider |
| 6,651,905 B2 | 11/2003 | Sesser |
| 6,695,223 B2 | 2/2004 | Beutler |
| 6,732,950 B2 | 5/2004 | Ingham, Jr. |
| 6,732,952 B2 | 5/2004 | Kah |
| 6,736,332 B2 | 5/2004 | Sesser |
| 6,736,337 B2 | 5/2004 | Vildibill |
| 6,799,732 B2 | 10/2004 | Sirkin |
| 6,802,458 B2 | 10/2004 | Gregory |
| 6,814,304 B2 | 11/2004 | Onofrio |
| 6,814,305 B2 | 11/2004 | Townsend |
| 6,817,543 B2 | 11/2004 | Clark |
| 6,817,548 B2 | 11/2004 | Krauth |
| 6,827,291 B2 | 12/2004 | Townsend |
| 6,834,816 B2 | 12/2004 | Kah, Jr. |
| 6,840,460 B2 | 1/2005 | Clark |
| 6,848,632 B2 | 2/2005 | Clark |
| 6,854,664 B2 | 2/2005 | Smith |
| 6,869,026 B2 | 3/2005 | McKenzie |
| 6,883,727 B2 | 4/2005 | De Los Santos |
| 6,886,761 B2 | 5/2005 | Cohen |
| 6,893,002 B2 | 5/2005 | Brice |
| 6,921,029 B2 | 7/2005 | Lockwood |
| 6,942,164 B2 | 9/2005 | Walker |

(56) References Cited

U.S. PATENT DOCUMENTS

| | | |
|---|---|---|
| 6,945,471 B2 | 9/2005 | McKenzie |
| 6,997,393 B1 | 2/2006 | Angold |
| 7,017,831 B2 | 3/2006 | Santiago |
| 7,028,920 B2 | 4/2006 | Hekman |
| 7,032,836 B2 | 4/2006 | Sesser |
| 7,040,553 B2 | 5/2006 | Clark |
| 7,044,403 B2 | 5/2006 | Kah |
| 7,143,692 B2 | 12/2006 | Schmitt |
| 7,143,962 B2 | 12/2006 | Kah, Jr. |
| 7,152,814 B1 | 12/2006 | Schapper |
| 7,159,795 B2 | 1/2007 | Sesser |
| 7,168,444 B2 | 1/2007 | Sesser |
| 7,168,632 B2 | 1/2007 | Kates |
| 7,168,634 B2 | 1/2007 | Onofrio |
| 7,191,958 B1 | 3/2007 | Wang |
| 7,226,003 B2 | 6/2007 | Kah |
| 7,232,081 B2 | 6/2007 | Kah |
| 7,234,651 B2 | 6/2007 | Mousavi |
| 7,270,280 B2 | 9/2007 | Belford |
| 7,287,711 B2 | 10/2007 | Crooks |
| 7,287,712 B2 | 10/2007 | Kah |
| 7,303,153 B2 | 12/2007 | Han |
| 7,322,533 B2 | 1/2008 | Grizzle |
| 7,337,988 B2 | 3/2008 | McCormick |
| 7,370,667 B2 | 5/2008 | Sesser |
| 7,372,956 B1 | 5/2008 | Kikinis |
| RE40,440 E | 7/2008 | Sesser |
| 7,392,956 B2 | 7/2008 | McKenzie |
| 7,401,622 B2 | 7/2008 | Ungerecht |
| 7,404,525 B2 | 7/2008 | Santiago |
| 7,429,005 B2 | 9/2008 | Schapper |
| 7,438,083 B2 | 10/2008 | Feith |
| 7,478,526 B2 | 1/2009 | Mcafee |
| 7,478,646 B2 | 1/2009 | Borrenpohl |
| 7,500,619 B2 | 3/2009 | Lockwood |
| 7,597,273 B2 | 10/2009 | McAfee |
| 7,611,077 B2 | 11/2009 | Sesser |
| 7,621,464 B2 | 11/2009 | Smith |
| 7,621,467 B1 | 11/2009 | Garcia |
| 7,628,910 B2 | 12/2009 | Lockwood |
| 7,631,813 B1 | 12/2009 | Lichte |
| 7,644,870 B2 | 1/2010 | Alexander |
| 7,677,469 B1 | 3/2010 | Clark |
| 7,681,807 B2 | 3/2010 | Gregory |
| 7,686,236 B2 | 3/2010 | Alexander |
| 7,703,706 B2 | 4/2010 | Walker |
| 7,793,868 B2 | 9/2010 | Kah |
| 7,806,382 B1 | 10/2010 | Palumbo |
| 7,828,229 B2 | 11/2010 | Kah |
| 7,828,230 B1 | 11/2010 | Anuskiewicz |
| 7,834,816 B2 | 11/2010 | Marino |
| 7,841,547 B2 | 11/2010 | Kah |
| 7,850,094 B2 | 12/2010 | Richmond |
| 7,854,399 B2 | 12/2010 | Sirkin |
| 7,861,948 B1 | 1/2011 | Crooks |
| 7,896,021 B2 | 3/2011 | Claude |
| 8,006,919 B2 | 8/2011 | Renquist |
| 8,047,456 B2 | 11/2011 | Kah |
| 8,056,829 B2 | 11/2011 | Gregory |
| 8,136,743 B2 | 3/2012 | Kah |
| 8,187,471 B2 | 5/2012 | Lockwood |
| 8,272,578 B1 | 9/2012 | Clark |
| 8,297,533 B2 | 10/2012 | Dunn |
| 8,313,043 B1 | 11/2012 | Crooks |
| 8,408,482 B2 | 4/2013 | Gregory |
| 8,444,063 B2 | 5/2013 | Lichte |
| 8,474,733 B1 | 7/2013 | Clark |
| 8,540,171 B2 | 9/2013 | Renquist |
| 8,596,559 B2 | 12/2013 | Kah, Jr. |
| 8,628,027 B2 | 1/2014 | Kah |
| 8,636,229 B1 | 1/2014 | Clark |
| 8,636,230 B1 | 1/2014 | Clark |
| 8,636,233 B2 | 1/2014 | Clark |
| 8,714,186 B2 | 5/2014 | Ungerecht |
| 8,727,238 B1 | 5/2014 | Clark |
| 8,740,177 B2 | 6/2014 | Walker |
| 8,746,591 B2 | 6/2014 | Lichte |
| 8,794,542 B1 | 8/2014 | Hunter |
| 8,833,672 B2 | 9/2014 | Skripkar |
| 8,857,742 B2 | 10/2014 | Onofrio |
| 8,893,986 B2 | 11/2014 | Kah, Jr. |
| 8,939,384 B2 | 1/2015 | Anuskiewicz |
| 8,950,789 B2 | 2/2015 | Jahan |
| 8,955,767 B1 | 2/2015 | Clark |
| 8,991,725 B2 | 3/2015 | Kah |
| 8,991,726 B2 | 3/2015 | Kah, Jr. |
| 8,991,730 B2 | 3/2015 | Kah, Jr. |
| 9,038,665 B2 | 5/2015 | Cheng |
| 9,038,924 B2 | 5/2015 | Lo |
| 9,120,111 B2 | 9/2015 | Nations |
| 9,138,768 B2 | 9/2015 | Jahan |
| 9,156,043 B2 | 10/2015 | Walker |
| 9,169,944 B1 * | 10/2015 | Dunn .................. B05B 1/26 |
| 9,192,956 B2 | 11/2015 | Kah, Jr. |
| 9,205,435 B1 | 12/2015 | Clark |
| 9,242,255 B2 | 1/2016 | Lichte |
| 9,296,004 B1 | 3/2016 | Clark |
| 9,341,270 B2 | 5/2016 | Boretti |
| 9,348,344 B2 | 5/2016 | Le |
| 9,387,494 B2 | 7/2016 | Sesser |
| 9,440,250 B2 | 9/2016 | Walker |
| 9,446,421 B1 | 9/2016 | Anuskiewicz |
| 9,459,631 B2 | 10/2016 | Lawyer |
| 9,511,387 B2 | 12/2016 | Keren |
| 9,573,145 B2 | 2/2017 | Kah, Jr. |
| 9,578,817 B2 | 2/2017 | Dunn |
| 9,616,437 B2 | 4/2017 | Onofrio |
| 9,662,668 B1 | 5/2017 | Clark |
| 9,776,195 B2 | 10/2017 | Russell |
| 9,851,037 B2 | 12/2017 | Whitaker |
| 9,937,513 B2 | 4/2018 | Kah, III |
| 9,981,276 B2 | 5/2018 | Kah, Jr. |
| 9,987,639 B2 | 6/2018 | Russell |
| 10,029,265 B2 | 7/2018 | Bell |
| 10,058,042 B2 | 8/2018 | Crist |
| 10,099,231 B2 | 10/2018 | Clark |
| 10,213,802 B2 | 2/2019 | Kah, Jr. |
| 10,220,405 B2 | 3/2019 | Kah, Jr. |
| 10,232,387 B2 | 3/2019 | Kah, Jr. |
| 10,267,248 B2 | 4/2019 | Kimoto |
| 10,293,359 B1 | 5/2019 | Polen |
| 10,464,083 B2 | 11/2019 | Onofrio |
| 10,556,248 B2 | 2/2020 | Wright, III |
| 10,559,949 B2 | 2/2020 | Paul |
| 10,717,093 B2 | 7/2020 | Bell |
| 10,744,522 B2 | 8/2020 | Wu |
| 10,786,823 B2 | 9/2020 | Clark |
| 10,828,651 B2 | 11/2020 | Kah, Jr. |
| RE48,397 E | 1/2021 | Kah, Jr. |
| 11,040,359 B2 | 6/2021 | Simmons |
| 11,090,675 B2 | 8/2021 | Renquist |
| 11,103,890 B1 | 8/2021 | Morris |
| 11,110,477 B2 | 9/2021 | Luo |
| 11,126,208 B2 | 9/2021 | Nelson |
| 11,406,999 B2 | 8/2022 | Belongia |
| 11,408,515 B2 | 8/2022 | Greenwood |
| 11,478,804 B2 | 10/2022 | Kah, Jr. |
| 11,511,289 B2 | 11/2022 | Geerligs |
| 11,612,904 B2 | 3/2023 | Wildt |
| 11,660,621 B2 | 5/2023 | Walker |
| 2002/0023972 A1 | 2/2002 | Kah |
| 2002/0104902 A1 | 8/2002 | Eckstein |
| 2002/0104903 A1 | 8/2002 | Eckstein |
| 2002/0130202 A1 | 9/2002 | Kah |
| 2002/0158145 A1 | 10/2002 | Schneider |
| 2003/0006306 A1 | 1/2003 | Clark |
| 2003/0006307 A1 | 1/2003 | Clark |
| 2003/0155433 A1 | 8/2003 | Gregory |
| 2003/0213856 A1 | 11/2003 | Sirkin |
| 2004/0050958 A1 | 3/2004 | McKenzie |
| 2005/0011554 A1 | 1/2005 | Davila |
| 2005/0133619 A1 | 6/2005 | Clark |
| 2005/0194464 A1 | 9/2005 | Bruninga |
| 2006/0049275 A1 | 3/2006 | Santiago |

(56) References Cited

U.S. PATENT DOCUMENTS

| | | |
|---|---|---|
| 2006/0186228 A1 | 8/2006 | Belford |
| 2006/0273196 A1 | 12/2006 | Crooks |
| 2007/0119974 A1 | 5/2007 | Johnson |
| 2007/0119975 A1 | 5/2007 | Hunnicutt |
| 2007/0119978 A1 | 5/2007 | Wang |
| 2007/0138323 A1 | 6/2007 | Lee |
| 2007/0194150 A1 | 8/2007 | Ericksen |
| 2007/0235565 A1 | 10/2007 | Kah |
| 2007/0262168 A1 | 11/2007 | Ericksen |
| 2008/0054092 A1 | 3/2008 | Alexander |
| 2008/0067266 A1 | 3/2008 | Cohen |
| 2008/0087743 A1 | 4/2008 | Govrin |
| 2008/0105768 A1 | 5/2008 | Kertscher |
| 2008/0142618 A1 | 6/2008 | Smith |
| 2008/0237374 A1 | 10/2008 | Belford |
| 2008/0257982 A1 | 10/2008 | Kah |
| 2008/0308650 A1 | 12/2008 | Clark |
| 2009/0065606 A1 | 3/2009 | Lee |
| 2009/0072048 A1 | 3/2009 | Renquist |
| 2009/0159726 A1 | 6/2009 | Thompson |
| 2009/0165879 A1 | 7/2009 | Socolsky |
| 2009/0173804 A1 | 7/2009 | Kah |
| 2009/0188988 A1 | 7/2009 | Walker |
| 2009/0314377 A1 | 12/2009 | Giuffre |
| 2010/0078508 A1 | 4/2010 | South |
| 2010/0090024 A1 | 4/2010 | Hunnicutt |
| 2010/0090036 A1 | 4/2010 | Allen |
| 2010/0108787 A1 | 5/2010 | Walker |
| 2010/0243762 A1 | 9/2010 | Onofrio |
| 2010/0276512 A1 | 11/2010 | Nies |
| 2010/0301135 A1 | 12/2010 | Hunnicutt |
| 2010/0301142 A1 | 12/2010 | Hunnicutt |
| 2010/0327083 A1 | 12/2010 | Kah |
| 2011/0017842 A1 | 1/2011 | Nations |
| 2011/0036933 A1 | 2/2011 | Kah |
| 2011/0057048 A1 | 3/2011 | McAfee |
| 2011/0084151 A1 | 4/2011 | Dunn |
| 2014/0042250 A1 | 2/2014 | Maksymec |
| 2014/0042251 A1 | 2/2014 | Maksymec |
| 2014/0246513 A1 | 9/2014 | Terrell |
| 2014/0263735 A1 | 9/2014 | Nations |
| 2015/0083828 A1 | 3/2015 | Maksymec |
| 2016/0243563 A1 | 8/2016 | Maksymec |
| 2018/0015487 A1 | 1/2018 | Russell |
| 2018/0250692 A1 | 9/2018 | Kah, Jr. |
| 2019/0076858 A1 | 3/2019 | Clark |
| 2019/0143360 A1 | 5/2019 | Kah, Jr. |
| 2019/0143361 A1 | 5/2019 | Kah, Jr. |
| 2020/0156099 A1 | 5/2020 | Wright, III |
| 2021/0095778 A1 | 4/2021 | Hansen |
| 2021/0162449 A1 | 6/2021 | McAfee |
| 2021/0404572 A1 | 12/2021 | Nelson |
| 2022/0022391 A1 | 1/2022 | Gazit |
| 2022/0152642 A1 | 5/2022 | McAfee |
| 2022/0297139 A1 | 9/2022 | Bell |
| 2022/0297140 A1 | 9/2022 | McAfee |
| 2022/0339656 A1 | 10/2022 | Belongia |

OTHER PUBLICATIONS

Utility U.S. Appl. No. 17/975,345, filed Oct. 27, 2022 for Multi-Mode Rotor Sprinkler Apparatus And Method, 50 pages.

USPTO; U.S. Appl. No. 17/526,214; Final Rejection dated Aug. 11, 2023; (pp. 1-15).

USPTO; U.S. Appl. No. 17/526,214; Non-Final Rejection dated Apr. 6, 2023; (pp. 1-11).

* cited by examiner

IRRIGATION SPRINKLER SERVICE VALVE

CROSS-REFERENCE TO RELATED APPLICATIONS

This application claims benefit of and priority to U.S. Provisional Application No. 62/907,289, filed Sep. 27, 2019.

FIELD OF THE INVENTION

The subject matter relates to a service valve and, more particularly, to a service valve for use at an irrigation sprinkler.

BACKGROUND OF THE INVENTION

Irrigation of turf is commonly done by inground irrigation systems. These systems commonly include sprinklers that are activated by a controller running a watering schedule. The controller typically turns off and on a valve. When in the on state, water flows and activates the sprinkler to irrigate, and in the off state, water is cut off from the sprinkler. The control valve is either located remote from the sprinkler and controls a zone of irrigation devices or the control valve is integrated with the sprinkler. When the control valve is integral with the sprinkler, the valve is positioned in the housing of the sprinkler upstream of a riser that extends for irrigation and retracts between irrigation cycles.

If a sprinkler is damaged and leaking it would have to be replaced immediately to ensure that the remainder of the irrigation branch line is still functional. Also, control valves in sprinklers can require servicing from time-to-time due to ordinary wear and tear or debris becoming lodged in the valve seat area. This is the same for other components of the sprinkler. To provide maintenance, one would have to shut off an upstream service valve. The upstream service valve is typically located remotely from the sprinkler. Thus, there is a desire to have a service valve located at the sprinkler that enables servicing of all sprinkler sub-systems, including the control valve, without having to turn off a remotely located main valve.

DETAILED DESCRIPTION

Figure 1:
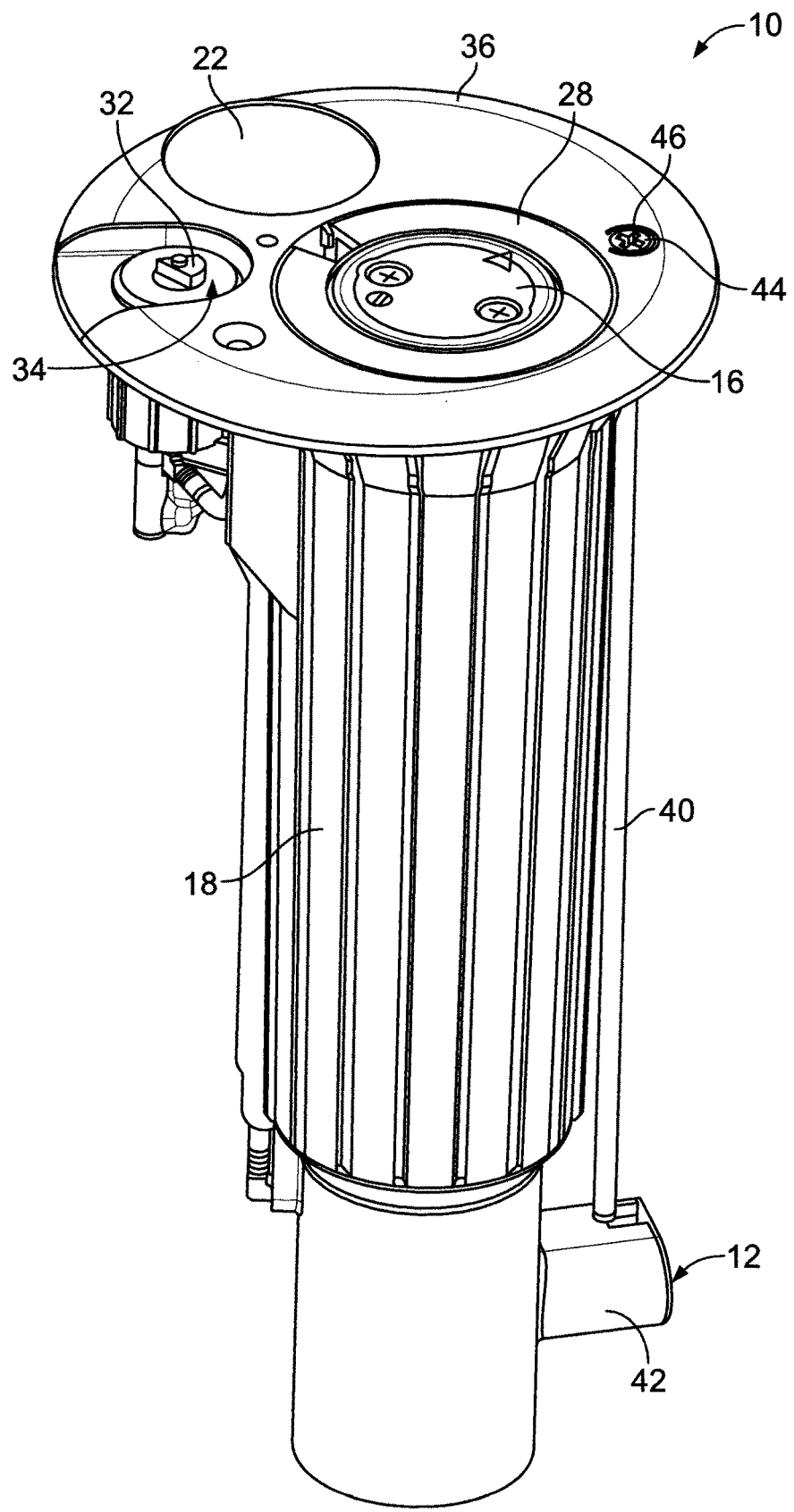
FIG. 1 is a perspective view of a sprinkler with a service valve.
Figure 2:
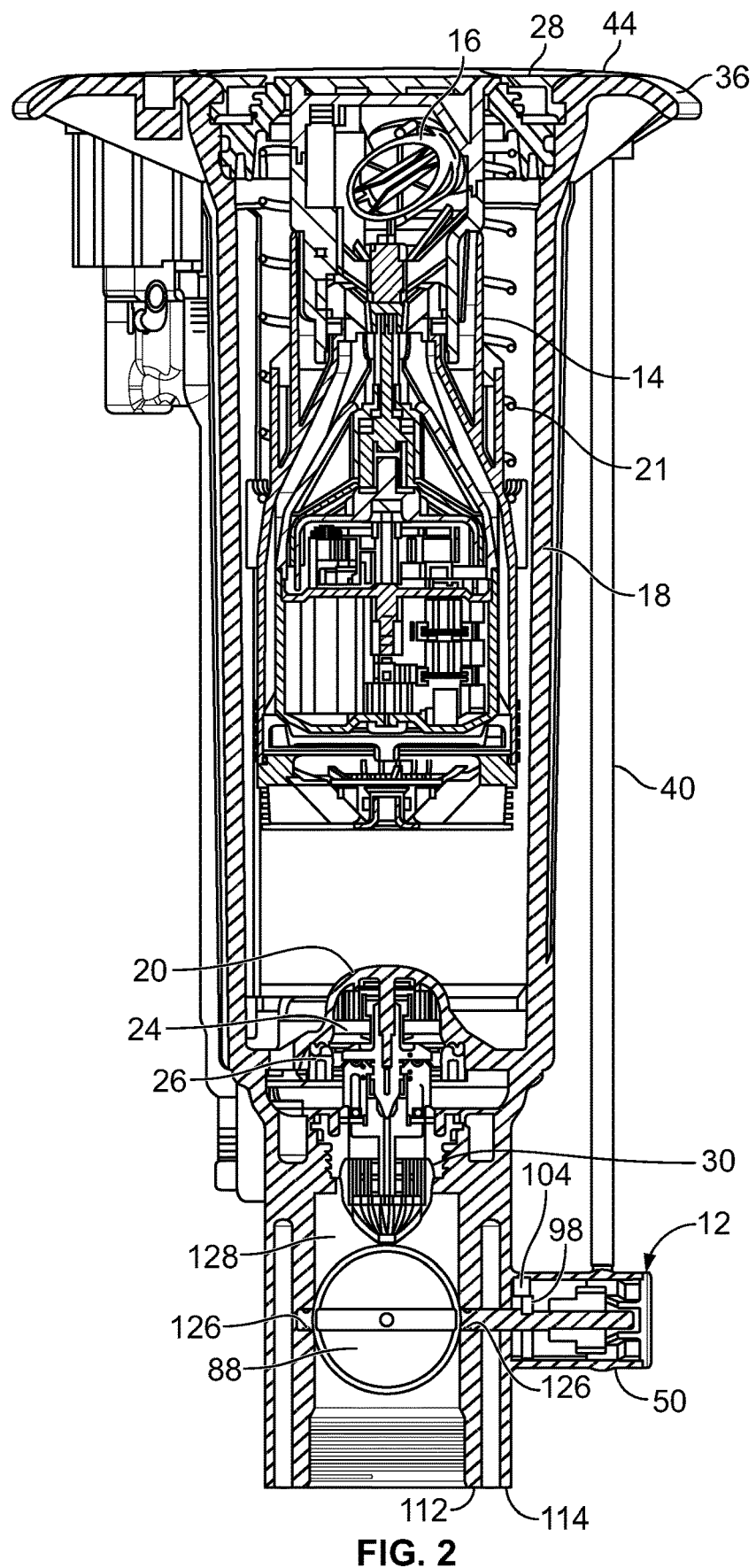
FIG. 2 is a cross-sectional view of the sprinkler of FIG. 1.
Figure 3:
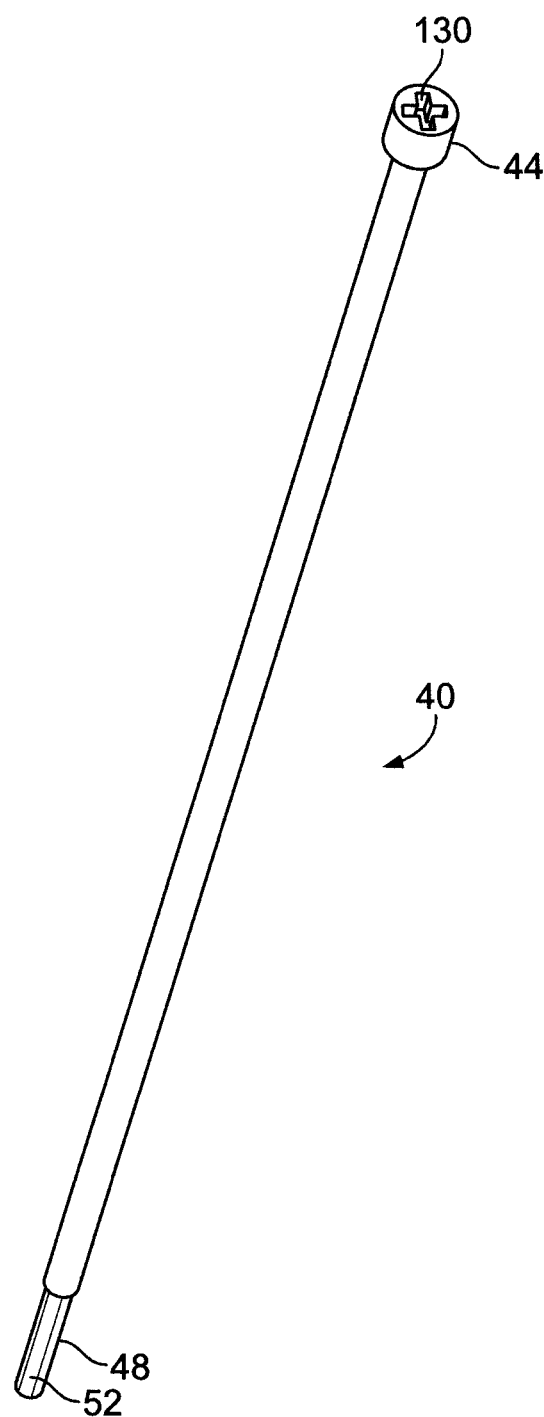
FIG. 3 is a perspective view of an activation shaft of the service valve of FIG. 1.
Figure 4:
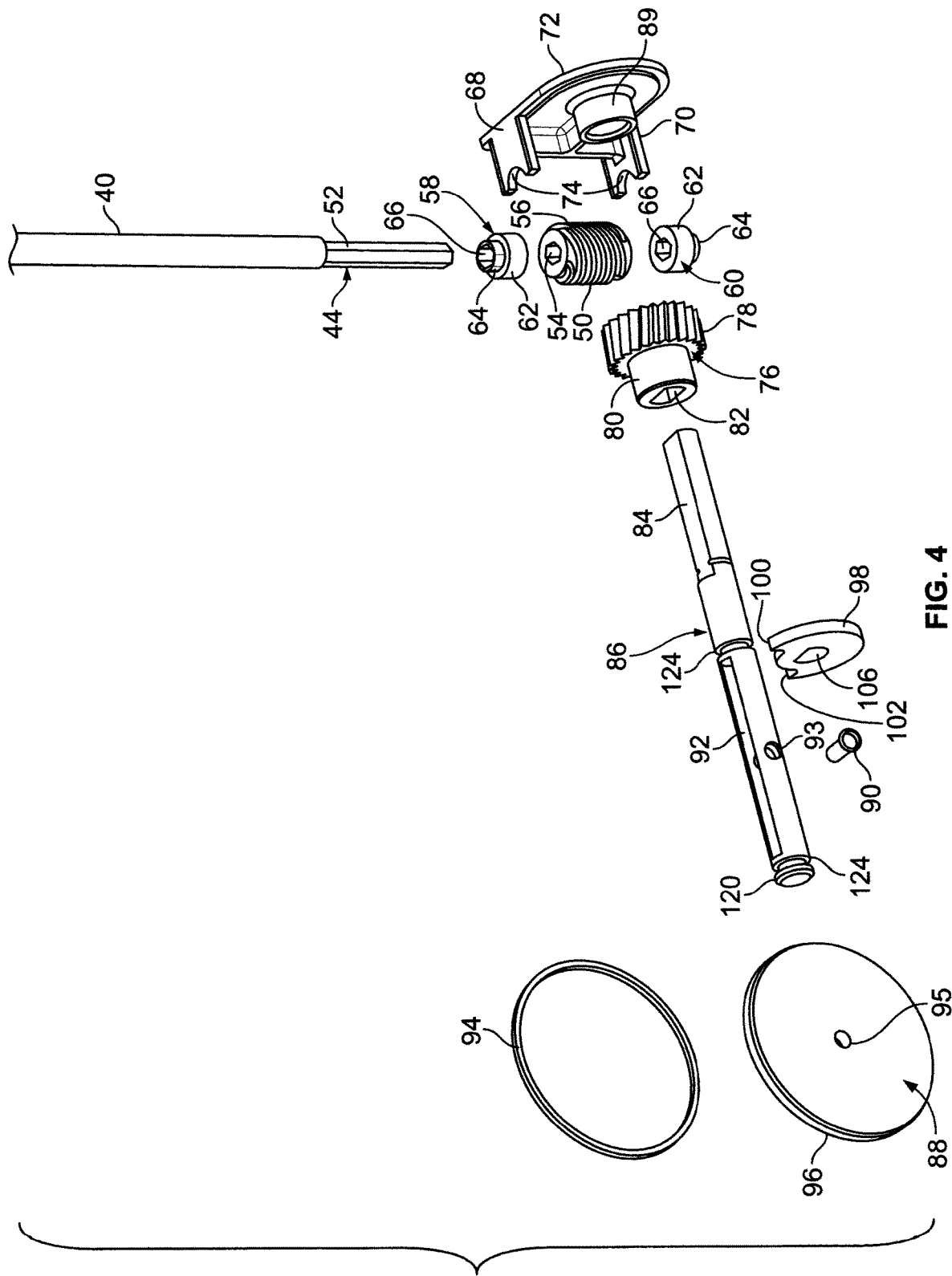
FIG. 4 is an exploded view of the service valve of FIG. 1 showing only a portion of the activation shaft.
Figure 5:
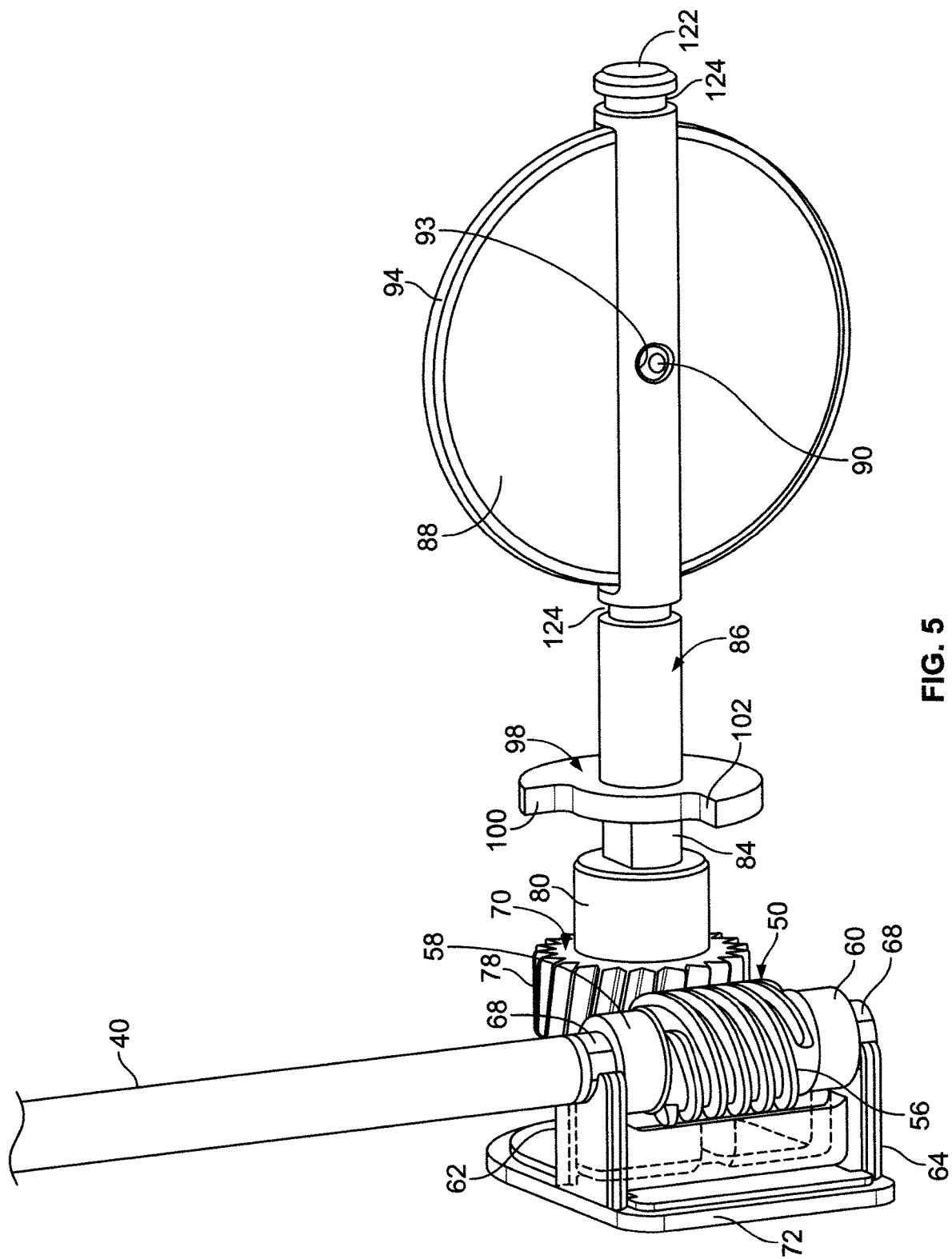
FIG. 5 is a perspective view of the service valve of FIG. 1 with a transfer case and chamber housing removed and showing only a portion of the activation shaft.
Figure 6:
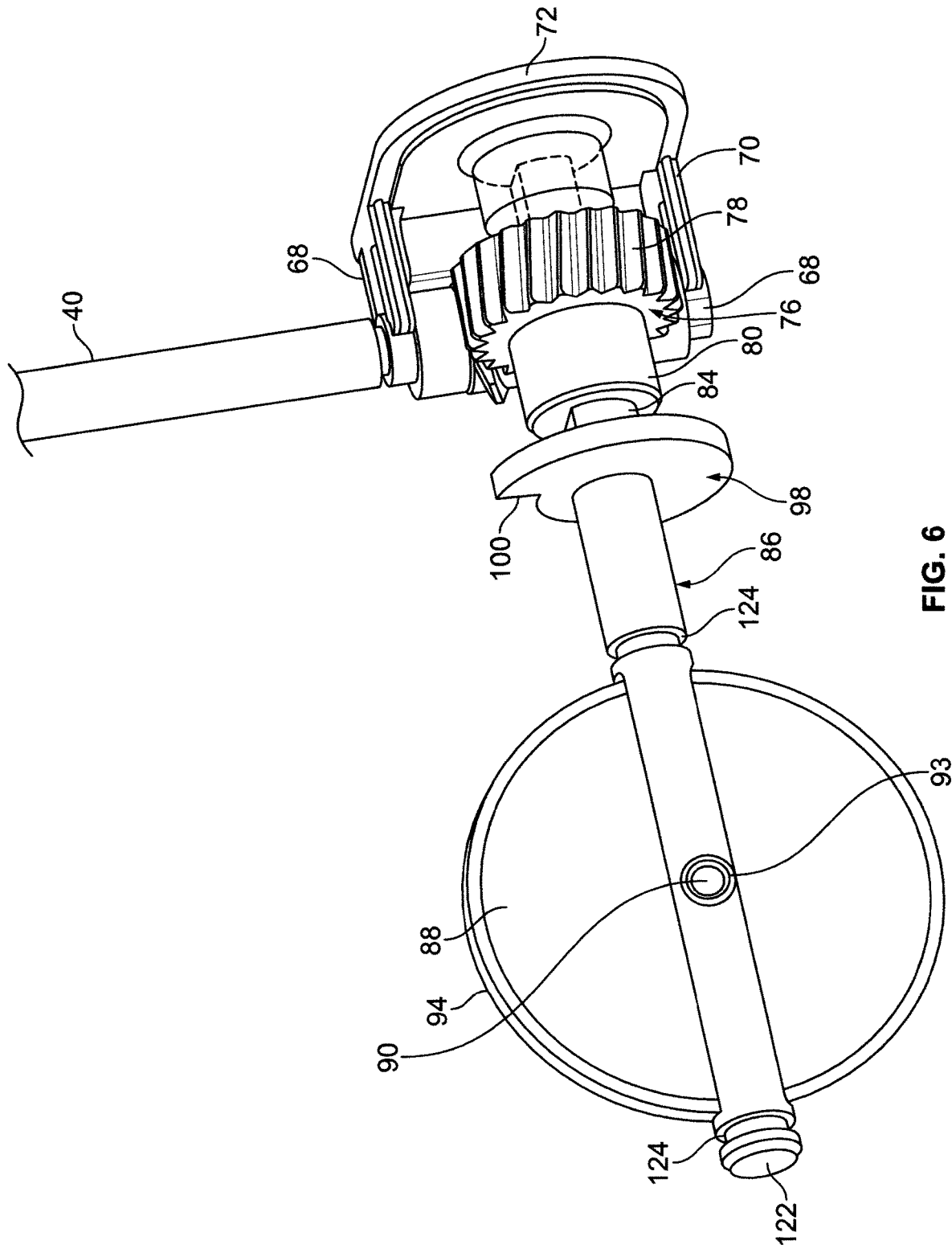
FIG. 6 is another perspective view of the service valve of FIG. 1 with a transfer case and chamber housing removed and showing only a portion of the activation shaft.
Figure 7:
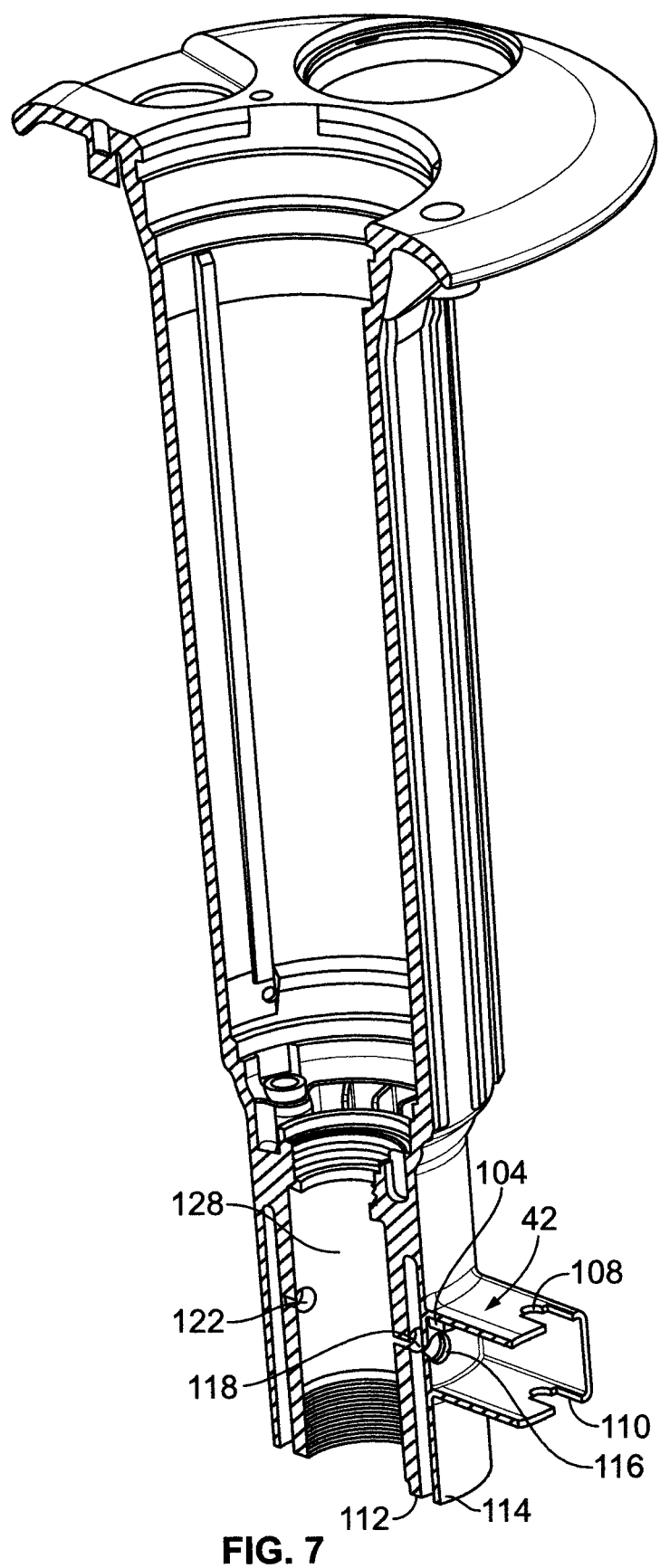
FIG. 7 is cross-sectional view of the housing and a transfer case of the service valve of the sprinkler of FIG. 1.
Figure 8:
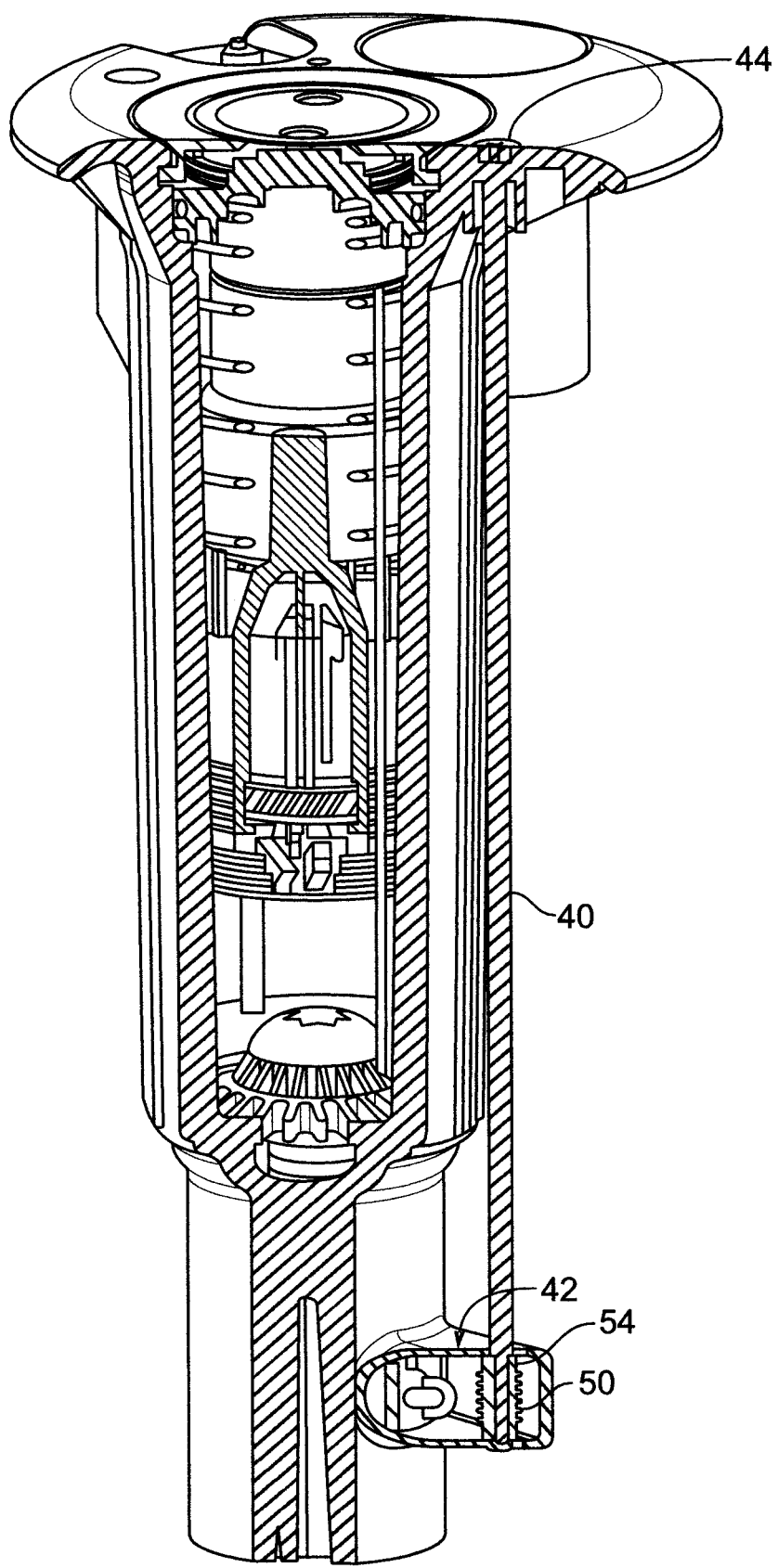
FIG. 8 is another cross-sectional of the sprinkler of FIG. 1.

With reference to FIGS. 1-8, there is illustrated an exemplary embodiment of a sprinkler 10 with a service valve 12 that enables maintenance of all sub-systems of the sprinkler without having to close a remotely located service valve. This isolation of a sprinkler enables all sprinklers or other water emission devices on the same irrigation branch to continue in operation.

The sprinkler 10 includes the following sub-systems. A riser 14 with a nozzle 16 that is activated to extend from a housing 18 when a control valve 20 is actuated to open, allowing fluid flow through the sprinkler 10. A spring 21 retracts the riser 14 into the housing 18 when the control valve 20 is closed between irrigation cycles. The control valve 20 receives signals from a remote controller running a watering schedule. The signals can be electrical current that energizes a solenoid 22 to open a pilot valve (not shown) to allow a pressure chamber 24 of the control valve 20 to be relieved, which allows water flow to open a diaphragm 26 and continue through the sprinkler to be discharged through the nozzle 16. When the signal ceases, the pilot valve closes and pressure in the pressure chamber 24 increases closing the diaphragm 26 of the control valve 20. The control valve 20 can be in the form of module that can be repaired or replaced when it is not operating properly. The control valve 20 can be accessed through the housing 18 by removing a snap ring 28 and then the riser 14. Upstream of the control valve 20 is a filter 30 that can be serviced once the control valve 20 is removed.

The sprinkler 10 can include a pressure regulator 32 to control the amount of flow through the sprinkler 10. The pressure regulator 32 enables one to set the desired throw distance of the sprinkler 10. A manual ON/OFF/AUTO control feature 34 can be included at the regulator. This feature allows one to turn the sprinkler 10 manually on between irrigation cycles or to turn it off during an irrigation cycle. It also allows one to set the sprinkler 10 to AUTO in which the sprinkler 10 is controlled by the controller.

All the above sub-systems can be serviced, including the control valve 20, when the water is shut off upstream of the control valve 20. The service valve 12 operates upstream of control valve 20 and is actuatable from a flange 36 at a top of the housing 18. The service valve 12 includes an ON position in which the sprinkler 10 operates normally and under control of the controller and its watering schedule. The service valve 12 also has an OFF position that shuts off water to the sprinkler 10, and thus, the controller watering signals do not cause the sprinkler 10 to operate.

The service valve 12 is disposed in a lower portion 38 of the housing 18. The service valve 12 includes an activation shaft 40 that extends from the flange 36 to a transfer case 42. A first end 44 of the activation shaft 40 is enlarged and extends into a hole 46 in the flange 36 and can be turned, such as with a tool, to operate the service valve 12. A second end 48 of the activation shaft 40 extends into the transfer case 42 and turns a pair of transfer gears. A worm gear 50 includes a direct connection to the activation shaft 40. The first end 44 of the activation shaft 40 includes faces 52 that engage complementary faces in a socket hole 54 of the worm gear 50. The worm gear 50 includes right-hand threading 56.

The worm gear 50 is held in position by an upper bearing 58 and a lower bearing 60. The bearings 58, 60 include a first cylindrical portion 62 and a second cylindrical portion 64. The second cylindrical portion 64 has a smaller outer diameter than the first cylindrical portion 62. The cylindrical portions 62, 64 have a smooth outer surface. The bearings 58, 60 have an inner passage 66 with faces that engage the faces 52 of the activation shaft 40 such that the bearings 58, 60 turn with the worm gear 50. The smooth outer surface of the second cylindrical portions engage an upper support 68 and a lower support 70 extending into the transfer case 42 from a cover 72. The supports 68, 70 define an arcuate notch 74 that engages the smooth outer surface of the bearings 58, 60 to allow for rotation.

The worm gear 50 meshes with a right-hand helical gear 76. The helical gear 76 has a geared portion 78 that engages the threading 56 of the worm gear 50 and a bearing portion 80. The helical gear 76 defines a passage 82 with faces that receives a first end portion 84 of a valve stem 86. The first end portion 84 includes faces that engage the faces in the passage 82 such that the helical gear 76 rotates the valve stem 86.

The valve stem 86 is connected to a butterfly valve plate 88 that opens and closes in response to turning of the valve stem 86. The valve plate 88 is mounted with a pin or rivet 90 in an elongated slot 92 defined by a second end portion 87 of the valve stem 86, where half of the valve plate 88 is disposed on one side of the valve stem 86 and the other half is symmetrically disposed on the other side of the valve stem 86. The pin 90 extends through aligned holes 93 in the valve stem 86 and a hole 95 in the center of the valve plate 88. A seal 94 is mounted in a recess 96 formed in an outer perimeter of the valve plate 88 for sealing against the lower portion 38 of the housing 18 when the valve plate 88 is in the closed position. The cover 72 of the transfer case 42 includes a boss 89 that supports the first end portion 84 of the valve stem 86.

The valve plate 88 is illustrated in the open position. For the closed position, the valve plate 99 is rotated ninety degrees. A stop plate 98 limits rotation of the valve stem 86 to the open and closed positions. The stop plate 98 includes an open stop surface 100 and a closed stop surface 102. The closed and open stop surfaces 100, 102 engage a stop 104 in the transfer case 42 portion of the lower portion 38 of the housing 18 to prevent further rotation. The stop plate 98 defines a hole 106 through which the first end portion 84 of the valve stem 86 extends through. The hole 106 includes a flat surface that engages the flat surfaces of the first end portion 84 of the valve stem 86 so that the stop plate 106 rotates with the valve stem 86.

The activation shaft 40 extends into the transfer case 42 through a first slot 108 and is supported by the lower spacer 60 in a second slot 110. The second cylindrical portion 64 of the lower spacer 60 extends into the second slot 110. The lower portion 38 of the housing 18 has an inner wall 112 and an outer wall 114, with the walls being concentric. The valve stem 86 extends through a first hole 116 and a second hole 118 formed in the concentric walls 112, 114, and a terminal end 120 of the valve stem 86 is received in a recess 122 in the inner wall 112 of the concentric walls. The valve stem 86 includes two annular recesses 124 at the inner wall 112. A seal 126 is seated in each recess 124 to seal a valve chamber 128 in the lower portion 38 of the housing 18 where the valve plate 88 operates.

In operation, one can switch the service valve 12 between an open state and closed state by turning the first end 44 of the activation shaft 40. The first end 44 is configured with one or more slots 130 to be engaged by a tool. For example, as illustrated, the first end 44 is configured with slots 130 for use with a Phillips type screwdriver head. Other configurations of slots or sockets can be used with the first end to configure it to work with other desired tools.

The valve plate 88 is shown in the open state, i.e., the valve plate 88 extends in the direction of the flow through the valve chamber 128 of the service valve 12. The first end 44 of the activation shaft 40 can be turned counter-clockwise when viewed from the top of the sprinkler 10 to turn the service valve 12 to the closed position, where the valve plate 88 extends horizontally across the valve chamber (90 degrees from the position illustrated). As the activation shaft 40 turns clockwise, the worm gear 50 also turns counter-clockwise. The worm gear 50 turns the helical gear 76 clockwise (when looking from the right end) which, in turn, rotates the valve stem 86 clockwise. The turning can continue until stop surface 100 of the stop plate 98 engages the stop 104 of the transfer case 42 at which point the valve plate 88 is in the closed position. The service valve 12 also can be used to throttle the flow by leaving the valve plate 88 in a position between the open and closed positions. This intermediate positioning of the valve plate 88 can be used to control the flow through the sprinkler 10 and the throw distance of water discharged from the nozzle 16 of the sprinkler 10. The activation stem 40 can be turned clockwise to reverse the process and open the service valve 12.

Figure 9:
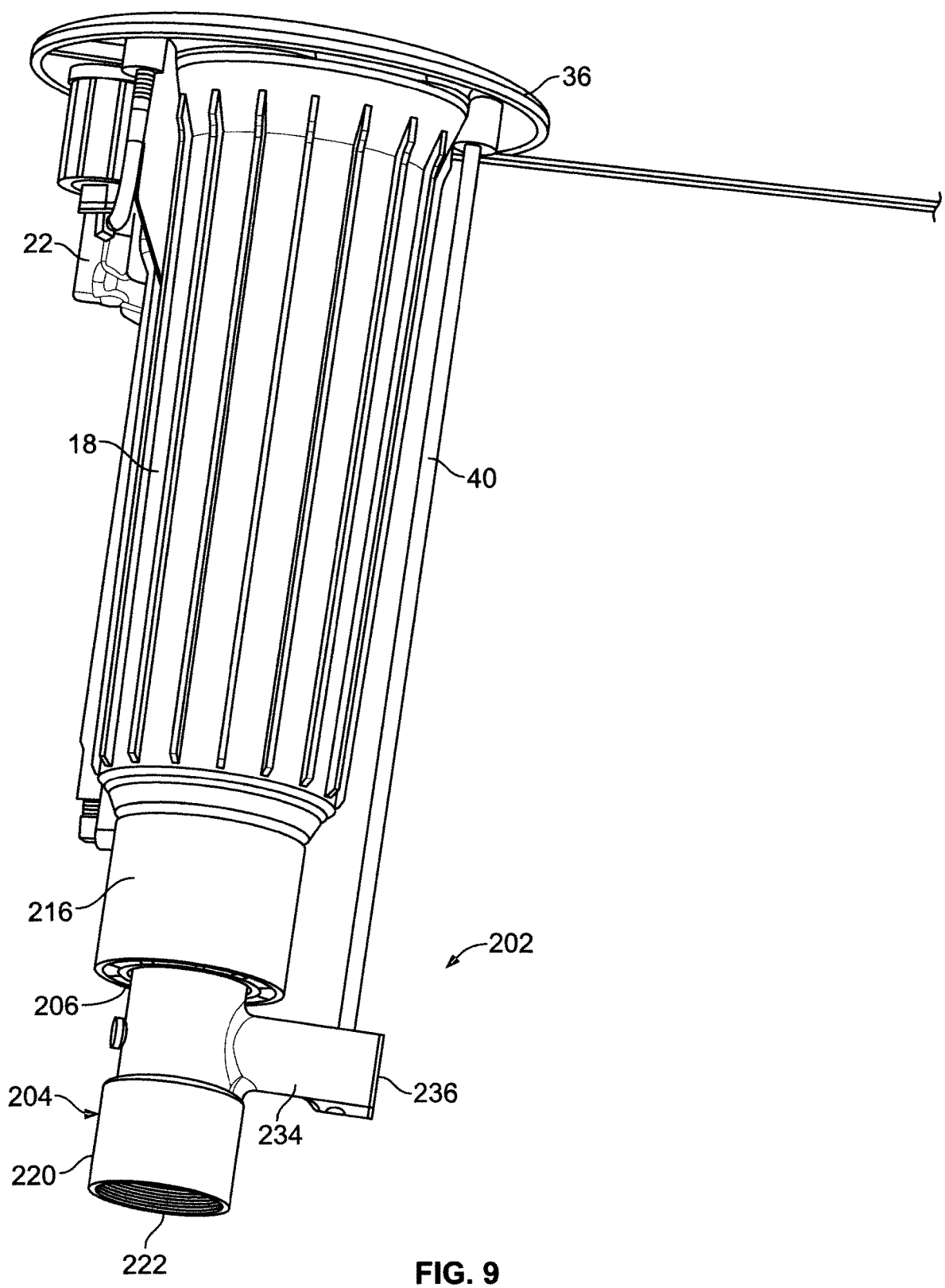
FIG. 9 is a perspective view of another sprinkler with a service valve.
Figure 10:
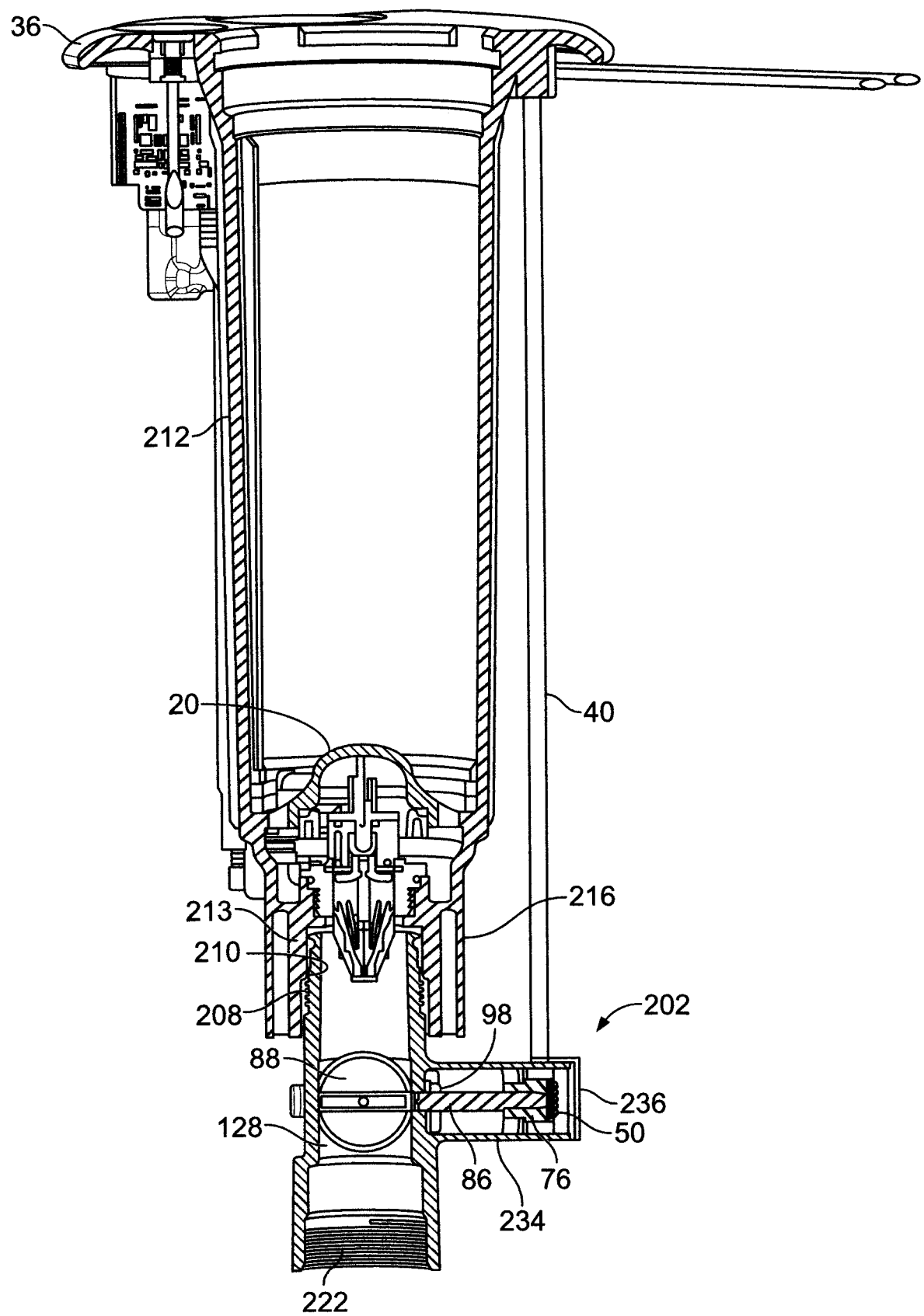
FIG. 10 is a cross-sectional view of the sprinkler of FIG. 9 with a riser removed from a housing of the sprinkler.
Figure 11:
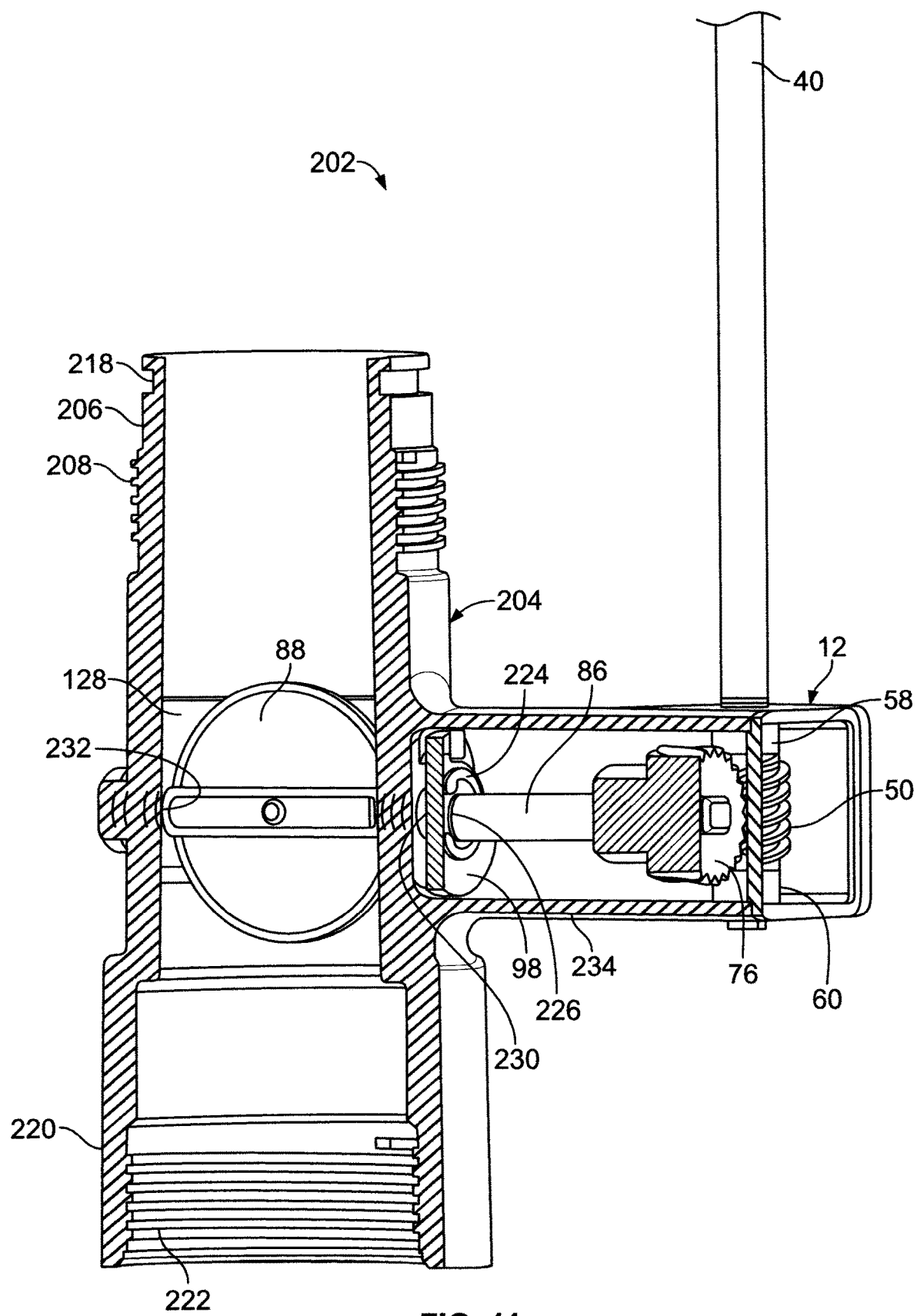
FIG. 11 is cross-sectional view of the service valve of the sprinkler of FIG. 9.

The service valve of FIGS. 1-8 has the valve chamber 128 formed as a single piece with the lower portion 38 of the housing 18. Alternatively, as showing in FIGS. 9-11, there is illustrated a service valve 202 that includes a separate valve housing 204 for the valve chamber 128. In this case, the valve housing 204 includes a downstream end portion 206 that has external threading 208 that mates with internal threading 210 of a housing 212 of a sprinkler 214 to mount the service valve 202 to the sprinkler 214. The sprinkler 214 is the same as sprinkler 10 except that an upstream end portion 216 of the housing 212 does not included the integral valve chamber 128. The downstream end portion of the valve housing 204 also includes an annular recess 218 that can carry an o-ring 213 to seal the connection between the valve housing 204 and the sprinkler housing 212. The valve housing 204 has an upstream end portion 220 that includes internal threading 222 for attaching the valve housing 204 to a supply line.

The internal components of the service valve 202 are the same as described above for service valve 12. Like components of service valve 202 have like references numbers as for service 12. There is illustrated a clip 224 that fits in an annular groove 226 to maintain the stop plate 98 in place. The clip 224 is not shown in the service valve 12 but can be used in that embodiment as well. The valve housing 204 includes a wall 228 enclosing the valve chamber 128. The wall 228 defines a passage 230 through which the valve stem 86 extends and a recess 232 for the terminal end 120 of the valve stem 86. A transfer case 234 extends laterally from the valve housing 204 and may be made as a single piece with the valve housing 204. The transfer case 234 includes a cover 236.

Figure 12:
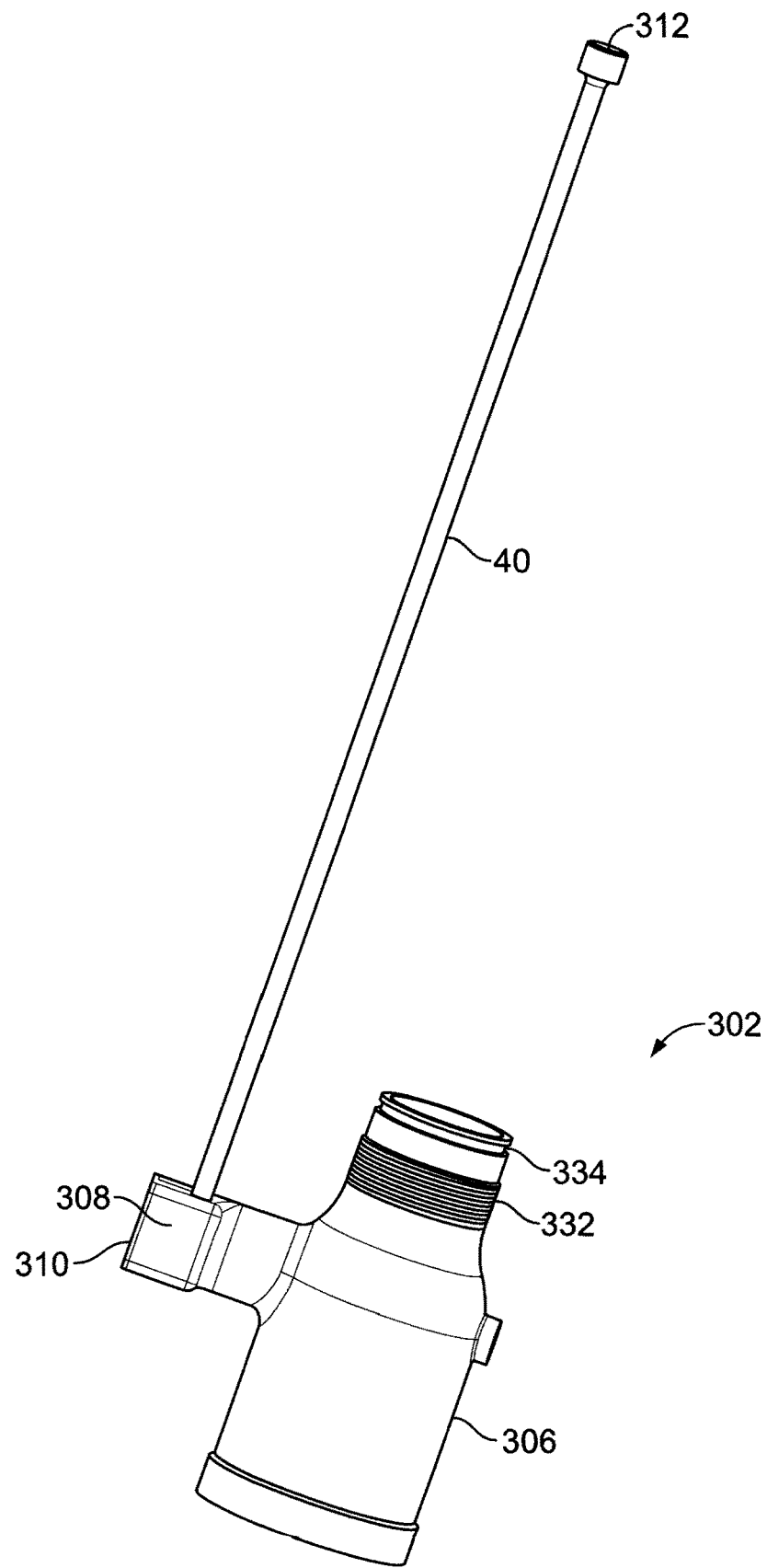
FIG. 12 is a perspective view of another service valve showing only a portion of the activation shaft.
Figure 13:
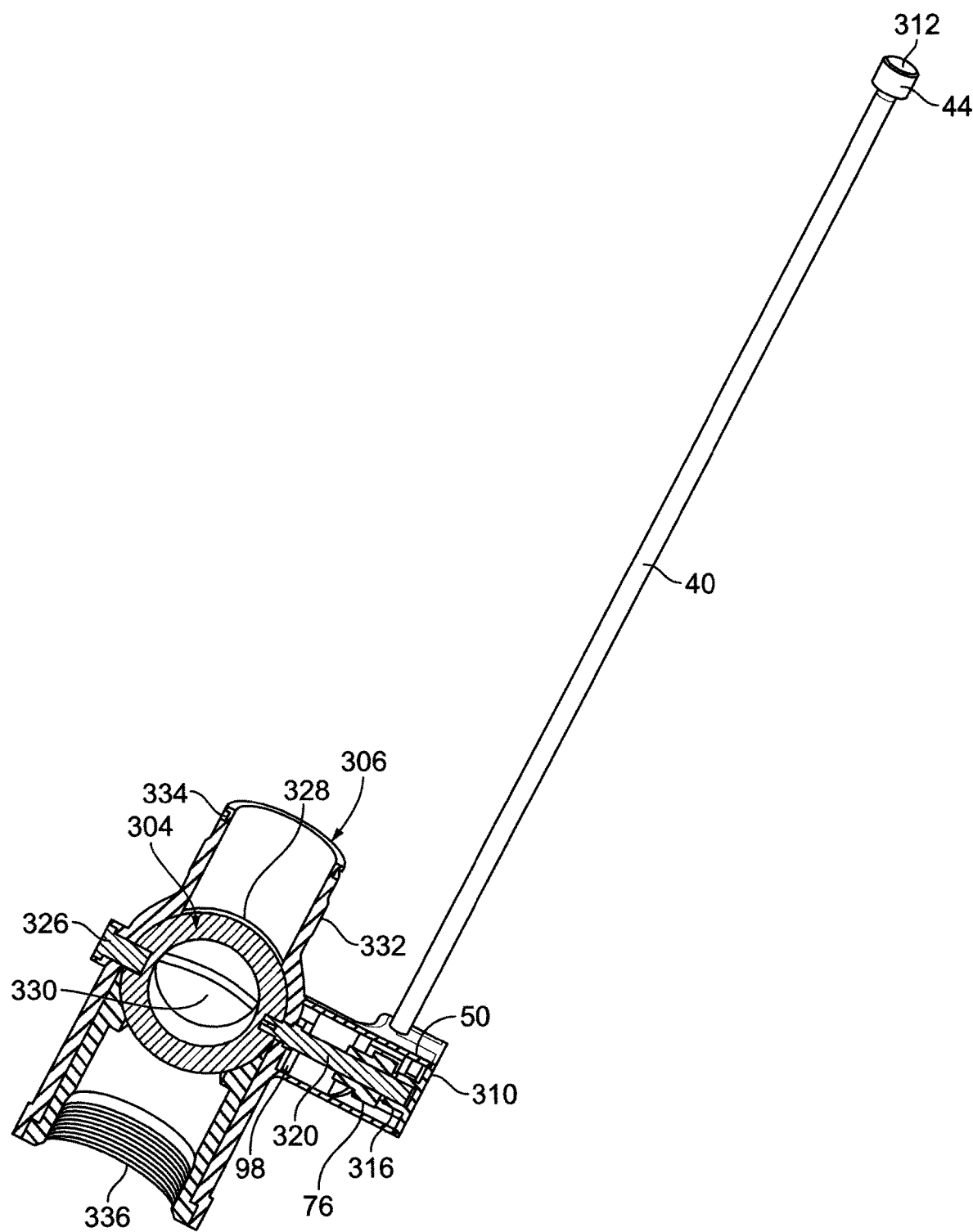
FIG. 13 is a cross-sectional view of the service valve of FIG. 12.
Figure 14:
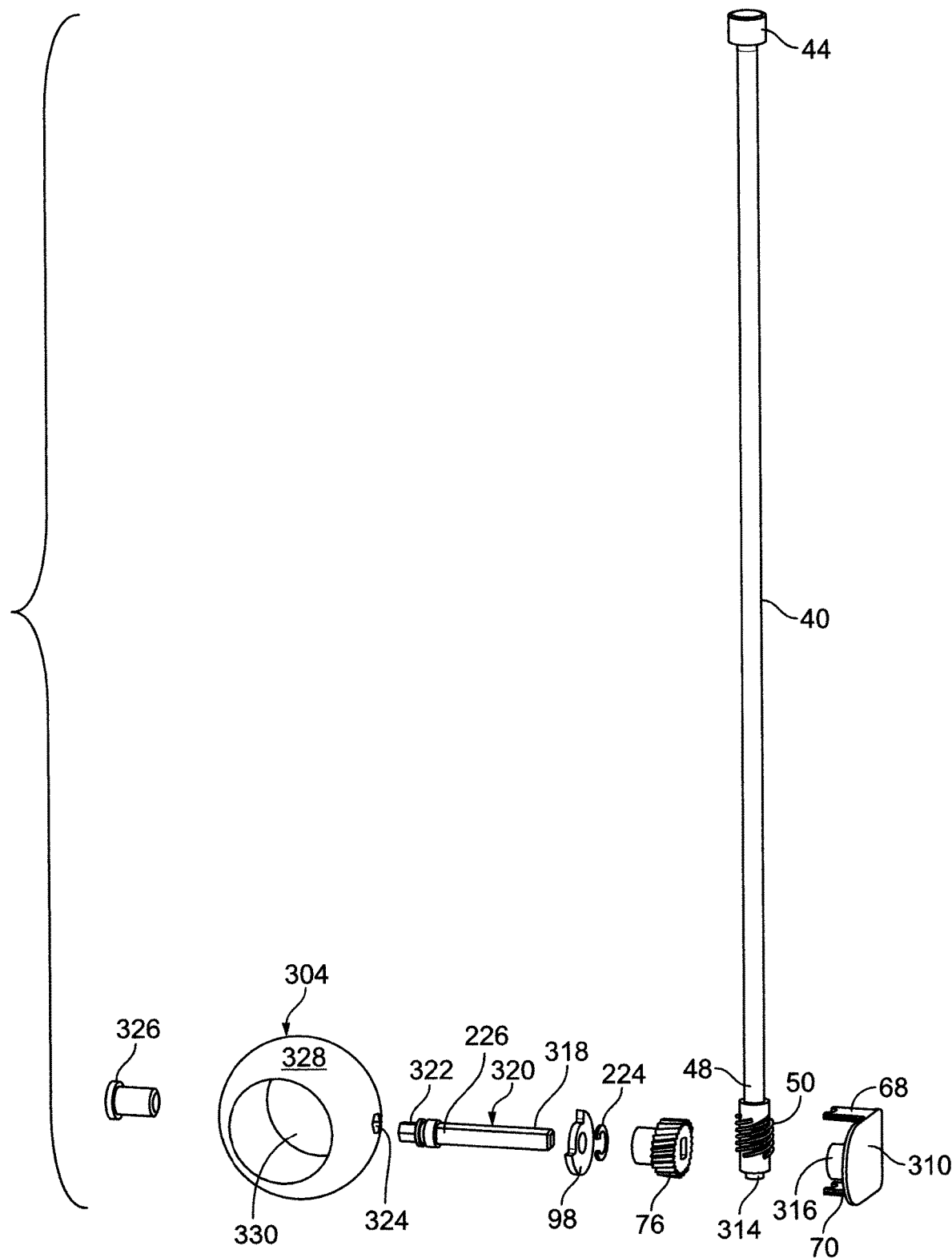
FIG. 14 is an exploded view of the service valve of FIG. 12 without a valve housing and transfer case.

The embodiments described above each employ a valve plate as the valving element to open and close the service valve. Other valve elements can be used to implement this aspect. For example, FIGS. 12-14 illustrate a service valve 302 employing a ball valve 304 for use with an irrigation sprinkler. Some of the components of service valve 302 are the same as that for service valves 12 and 202 so the same reference numbers will be used for those components.

The service valve 302 includes a valve housing 306 and a transfer case 308 extending laterally from the valve housing 306. The transfer case 308 includes a cover 310. The valve housing 306 includes external threading 332 that mates with internal threading 210 of the sprinkler housing 212. The valve housing 306 includes a recess 334 to hold a seal (such as an o-ring) to seal between the sprinkler housing 212 and valve housing 306. The valve housing 306 includes internal threading 336 to attach the service valve 302 to a supply line.

The activation shaft 40 includes the first end 44 but which is now configured with a socket 312 to receive a tool to rotate the actuator stem 40. The second end 48 turns the worm gear 50. The worm gear can be fitted on the second end 48 as described above or it can be integral with the second end 48 as a single piece. The worm gear 50 and activation shaft 40 are supported for rotation by the upper and lower supports 68, 70 of the cover 310. The worm gear 50 may include an integral bearing 314. The cover 310 further includes a boss 316 that supports a first end portion 318 of a valve stem 320.

As described above, the worm gear 30 meshes with and turns the helical gear 76, which, in turn, rotates the valve stem 320. The valve stem 320 supports the stop plate 98 that is held in place by the clip 224 and groove 226. The valve stem 320 includes a second end portion 322 with faces that fits into a correspondingly faced socket 324 in the ball valve 304. A pivot pin 326 attaches an opposite side of the ball valve 304 to the valve housing 306. The ball valve 304 includes a hemispherical outer surface 328 for blocking flow through the service valve 302 and a passage 330 to allow flow through the service valve 302.

The operation of the service valve 302 is like that described above except that the valve member is the ball valve 304. As illustrated, the ball valve 304 is in the OFF position. Turning the ball valve 304 ninety degrees will set the ball valve 304 in the fully ON position in which the passage 330 is aligned longitudinally with the valve housing 306. Any intermediate position between the OFF and ON positions can be used to restrict flow through the service valve 302, such as to control the throw distance of water discharged from a sprinkler. While the ball valve is shown used with a separate service valve housing, the ball valve could be used with a housing formed as a single piece with the sprinkler housing, as shown in the embodiment of FIG. 1.

As illustrated above, the actuation shaft 40 is the interface between the operator and the service valve. The actuation stem includes features to allow the operator to turn the stem to open or close the valve. While the illustrated actuation stem is manually operated, it may be motorized using a servo or other motor.

The matter set forth in the foregoing description and accompanying drawings is offered by way of illustration only and not as a limitation. While embodiments have been shown and described, it will be apparent to those skilled in the art that additions and modifications and alternate embodiments may be made without departing from the broader aspects of the technological contribution. The actual scope of the protection sought is intended to be defined in the following claims.

What is claimed is:

1. A sprinkler comprising:
    a sprinkler housing having an upstream end portion and a downstream end portion;
    a valve housing associated with the upstream end portion of the sprinkler housing:
    a valve chamber defined by the valve housing;
    a valve body disposed in the valve chamber and movable in the valve chamber between an open position and closed position;
    an activation shaft extending from the downstream end portion of the sprinkler housing to the valve housing; and
    a control valve for the sprinkler disposed in the upstream end portion of the sprinkler housing and the valve housing disposed upstream of the control valve.

2. The sprinkler of claim 1 wherein the valve housing is formed as a single piece with the sprinkler housing.

3. The sprinkler of claim 1 wherein the valve housing is mounted to the sprinkler housing.

4. The sprinkler of claim 1 wherein the valve body includes a plate that is rotatable in the valve chamber between the open position and the closed position.

5. The sprinkler of claim 1 further comprising a stop that limits movement of the valve body to between the open position and the closed position.

6. The sprinkler of claim 1 wherein the sprinkler housing comprises a flange and the activation shaft is exposed through the flange to activate the valve body.

7. The sprinkler of claim 1 wherein the activation shaft at the downstream end portion of the sprinkler housing is configured to be moved by a tool.

8. The sprinkler of claim 1 further comprises a motor to move the activation shaft.

9. A sprinkler comprising:
    a sprinkler housing having an upstream end portion and a downstream end portion;
    a valve housing associated with the upstream end portion of the sprinkler housing:
    a valve chamber defined by the valve housing;
        a valve body disposed in the valve chamber and movable in the valve chamber between an open position and closed position;
        an activation shaft extending from the downstream end portion of the sprinkler housing to the valve housing;
    the valve housing defines a transfer case and the activation shaft extends to the transfer case; and
    gearing located in the transfer case that transfers movement from the activation shaft to the valve body.

10. The sprinkler of claim 9 further comprising a valve stem that interconnects the gearing and the valve body.

11. A sprinkler comprising:
    a sprinkler housing having an upstream end portion and a downstream end portion;
    a valve housing associated with the upstream end portion of the sprinkler housing:
    a valve chamber defined by the valve housing;
        a valve body disposed in the valve chamber and movable in the valve chamber between an open position and closed position; and
        an activation shaft extending from the downstream end portion of the sprinkler housing to the valve housing; and
    gearing that transfers movement from the activation shaft to the valve body, the gearing comprises a worm gear and a helical gear.

* * * * *